Oct. 21, 1952     A. RADICE     2,615,068
ELECTRIC INDUCTION MOTOR WITH TOTALLY
ENCLOSED LIQUIDPROOF STATOR
Filed Jan. 12, 1948
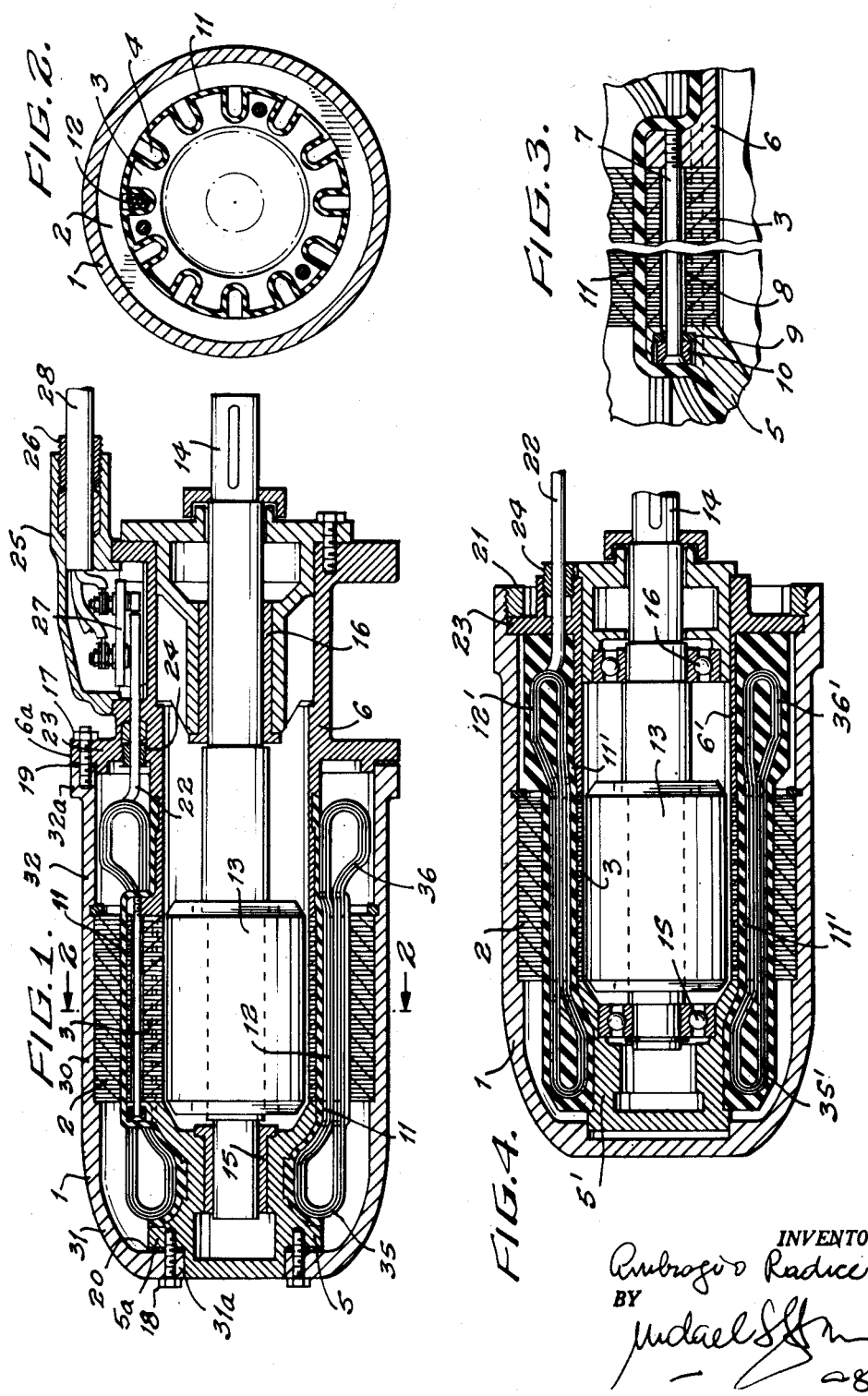
INVENTOR.
Ambrogio Radice
BY Patented Oct. 21, 1952

2,615,068

UNITED STATES PATENT OFFICE 2,615,068

ELECTRIC INDUCTION MOTOR WITH TOTALLY ENCLOSED LIQUIDPROOF STATOR

Ambrogio Radice, Milan, Italy, assignor to Ing. Silvio Immovilli, Milan, Italy

Application January 12, 1948, Serial No. 1,755
In Italy September 30, 1943

7 Claims. (Cl. 171—252)

The present invention relates to a liquid-impermeable stator for an electromotor adapted to be operated in a submerged condition.

It is an object of the present invention to design the stator in such a manner that the parts thereof can be easily fitted in position.

It is another object of the present invention to design the stator in such a way that the winding carrying part thereof can be brought into position hermetically sealed within the frame thereof without interference of the stator winding with the parts to be sealed to one another.

A stator according to the invention comprises in its broadest aspect an outer jacket having a cylindrical mid portion and two end portions, one of the end portions being cylindrical and having substantially the same diameter as the cylindrical middle portion, the other of the end portions being tapered, a first annular magnetic core connected to the middle portion of the outer jacket, an inner jacket including a first sleeve sealed hermetically to the tapering end portion of the outer jacket, a second annular magnetic core provided with axial grooves on the outer perimeter thereof and being arranged opposite to the first annular magnetic core, and a second sleeve sealed hermetically to the cylindrical end portion of the outer jacket, the sleeves being arranged, respectively, on the sides of the second annular magnetic core, and a stator winding arranged in the space between the jackets and located at least partly in the grooves of the second annular magnetic core whereby the inner jacket and the stator winding form a unit which can be introduced into and withdrawn from the outer jacket through the cylindrical end portion thereof.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 shows a longitudinal section of a first embodiment of an induction motor with liquid-proof stator according to the present invention;

Fig. 2 shows a cross-section taken along the line II—II of Fig. 1;

Fig. 3 shows on an enlarged scale a detail of Fig. 1; and

Fig. 4 shows a longitudinal section of a second embodiment of a motor according to the present invention.

Referring now to the drawings and first to Fig. 1, a first annular laminated magnetic core 2 is fitted to the inside of the frame 1 which forms the outer protection of the stator winding 12 and is secured to the frame by known means. This unit forms the outer jacket of the stator and has a cylindrical mid portion 30 and two end portions 31 and 32. The end portion 32 is cylindrical and has substantially the same diameter as the cylindrical middle portion 30. The other end portion 31 is tapered.

The inner jacket of the stator includes a second annular magnetic core 3, which is provided with axial grooves 4 (Fig. 2) on the outer perimeter thereof and two sleeves 5 and 6, secured to the magnetic core 3 for instance by means of tension rods 7 (see Fig. 3), which pass through the magnetic core 3 and which are insulated by means of a tube 8, and are riveted at one end to a metallic sleeve 10 which in its turn is insulated from the sleeve 5 by means of an insulating washer 9.

In order to obtain a tight sealing against pressure liquids between the inner face of the outer jacket and the grooves 4 in which the winding 12 (Fig. 2) is located, a sheath 11 (see Figs. 1 and 3) or coating of liquid-proof and insulating material is provided, which tightly covers the whole outer surface of the magnetic core 3, covering also wholly or partially the outer surfaces of the sleeves 5 and 6.

The stator winding 12 may be of the rim, coil or tile-shaped type and differs from the windings of normal type only in that it has one end loop 35 thereof turned inwardly towards the motor, whereas the other end loop 36 is turned outwardly from the motor so as to permit the inner jacket to be fitted within the outer jacket. Therefore, the sleeves 5 and 6 are correspondingly shaped, i. e., the maximum diameter of the sleeve 5 does not exceed the diameter of the magnetic core 3, whereas the sleeve 6 has an outer diameter allowing a hermetical sealing of the cylindrical end portion 32 of the outer jacket.

Moreover, the inner diameter of the sleeve 6 is equal to or larger than the diameter of the air gap of the motor, so as to permit insertion of a rotor core 13 carrying a cage-winding, into the motor. The rotor, provided with a shaft 14, is supported in bearings 15 and 16, which may be of the bronze-bush type, or of the roller type.

The inner jacket is secured and hermetically sealed within the outer jacket by means of bolts 17 and 18, washers 19 and 20 being interposed between the closing flanges 6a, 32a and 5a, 31a, respectively. If the outer jacket is closed at one end thereof, as shown in Fig. 4, no counterpressure will be exerted on the end support of the frame and the magnetic core 3, together with the sleeves 5' and 6' are allowed to expand axially. The sleeve 6 is secured to the outer jacket by means of a threaded nut 21.

The sleeve 6 may be extended externally of the motor (see Fig. 1) so as to allow the fitting on it of a terminal board 27, which can be made perfectly liquid-proof. It is sufficient to lead the ends 22 of the winding 12 through the flange 23 of the sleeve 6 by means of gaskets 24, and to cover the terminal board with a cover 25, provided with an inlet gasket 26 for the introduction of the main cable 28.

Having now particularly described and ascertained the nature of said invention, and in what manner the same is to be performed, I declare that what I claim is:

1. A liquid-impermeable stator for an electromotor adapted to be operated in a submerged condition, comprising in combination, an outer jacket having a cylindrical mid portion and two end portions, one of said end portions being cylindrical and having substantially the same diameter as said cylindrical mid portion, the other of said end portions being tapering; a first annular magnetic core connected to said middle portion of said outer jacket; an inner jacket including a first sleeve sealed hermetically to said tapering end portion of said outer jacket, a second annular magnetic core provided with axial grooves on the outer perimeter thereof and being arranged opposite to said first annular magnetic core, and a second sleeve sealed hermetically to said cylindrical end portion of said outer jacket, said sleeves being arranged, respectively, on the sides of said second annular magnetic core; and a stator winding arranged in the space between said jackets and located at least partly in the grooves of said second annular magnetic core, whereby said inner jacket and said stator winding form a unit which can be introduced into, and withdrawn from, said outer jacket through said cylindrical end portion thereof.

2. A liquid-impermeable stator for an electromotor adapted to be operated in a submerged condition, comprising in combination, an outer jacket having a cylindrical mid portion and two end portions, one of said end portions being cylindrical and having substantially the same diameter as said cylindrical mid portion, the other of said end portions being tapering; a first annular magnetic core connected to said middle portion of said outer jacket; an inner jacket including a first sleeve sealed hermetically to said tapering end portion of said outer jacket, a second annular magnetic core provided with axial grooves on the outer perimeter thereof and being arranged opposite to said first annular magnetic core, and a second sleeve sealed hermetically to said cylindrical end portion of said outer jacket, said sleeves being arranged, respectively, on the sides of said second annular magnetic core; means for pressing said sleeves toward each other so as to hold said second annular magnetic core firmly between said sleeves; and a stator winding arranged in the space between said jackets and located at least partly in the grooves of said second annular magnetic core, whereby said inner jacket and said stator winding form a unit which can be introduced into, and withdrawn from, said outer jacket through said cylindrical end portion thereof.

3. A liquid-impermeable stator for an electromotor adapted to be operated in a submerged condition, comprising in combination, an outer jacket having a cylindrical mid portion and two ends portions, one of said end portions being cylindrical and having substantially the same diameter as said cylindrical mid portion, the other of said end portions being tapering; a first annular magnetic core connected to said middle portion of said outer jacket; an inner jacket including a first sleeve sealed hermetically to said tapering end portion of said outer jacket, a second annular magnetic core provided with axial grooves on the outer perimeter thereof and being arranged opposite to said first annular magnetic core, and a second sleeve sealed hermetically to said cylindrical end portion of said outer jacket, said sleeves being arranged, respectively, on the sides of said second annular magnetic core; a stator winding arranged in the space between said jackets and located at least partly in the grooves of said second annular magnetic core; and an extension forming part of said second sleeve and carrying a terminal board for said stator winding, whereby said inner jacket and said stator winding form a unit which can be introduced into, and withdrawn from, said outer jacket through said cylindrical end portion thereof.

4. A liquid-impermeable stator for an electromotor adapted to be operated in a submerged condition, comprising in combination, an outer jacket having a cylindrical mid portion and two end portions, one of said end portions being cylindrical and having substantially the same diameter as said cylindrical mid portion, the other of said end portions being tapering; a first annular magnetic core connected to said middle portion of said outer jacket; an inner jacket including a first sleeve sealed hermetically to said tapering end portion of said outer jacket, a second annular magnetic core provided with axial grooves on the outer perimeter thereof and being arranged opposite to said first annular magnetic core, and a second sleeve sealed hermetically to said cylindrical end portion of said outer jacket, said sleeves being arranged, respectively, on the sides of said second annular magnetic core; means for pressing said sleeves toward each other so as to hold said second annular magnetic core firmly between said sleeves; a stator winding arranged in the space between said jackets and located at least partly in the grooves of said second annular magnetic core; and an extension forming part of said second sleeve and carrying a terminal board for said stator winding, whereby said inner jacket and said stator winding form a unit which can be introduced into, and withdrawn from, said outer jacket through said cylindrical end portion thereof.

5. A liquid-impermeable stator for an electromotor adapted to be operated in a submerged condition, comprising in combination, an outer jacket having a cylindrical mid portion and two end portions, one of said end portions being cylindrical and having substantially the same diameter as said cylindrical mid portion, the other of said end portions being tapering; a first annular magnetic core connected to said middle portion of said outer jacket; an inner jacket including a first sleeve sealed hermetically to said tapering end portion of said outer jacket, a second annular magnetic core provided with axial grooves on the outer perimeter thereof and being arranged opposite to said first annular magnetic core, and a second sleeve sealed hermetically to said cylindrical end portion of said outer jacket, said sleeves being arranged, respectively, on the sides of said second annular magnetic core; and a stator winding arranged in the space between said jackets and located at least partly in the grooves of said second annular magnetic core, said stator winding having end loops arranged, respectively, closely to said sleeves, said end loops arranged closely to said first sleeve being turned inwardly toward the axis of the motor, said end loops arranged closely to said second sleeve being turned outwardly from the axis of the motor, whereby said inner jacket and said stator winding form a unit which can be introduced into, and withdrawn from, said outer jacket through said cylindrical end portion thereof.

6. A liquid-impermeable stator for an electromotor adapted to be operated in a submerged condition, comprising in combination, an outer jacket having a cylindrical mid portion and two end portions, one of said end portions being cylindrical and having substantially the same diameter as said cylindrical mid portion, the other of said end portions being tapering; a first annular magnetic core connected to said middle portion of said outer jacket; an inner jacket including a first sleeve sealed hermetically to said tapering end portion of said outer jacket, a second annular magnetic core provided with axial grooves on the outer perimeter thereof and being arranged opposite to said first annular magnetic core, and a second sleeve sealed hermetically to said cylindrical end portion of said outer jacket, said sleeves being arranged, respectively, on the sides of said second annular magnetic core; a stator winding arranged in the space between said jackets and located at least partly in the grooves of said second annular magnetic core; and an extension forming part of said second sleeve and carrying a terminal board for said stator winding, said stator winding having end loops arranged, respectively, closely to said sleeves, said end loops arranged closely to said first sleeve being turned inwardly toward the axis of the motor, said end loops arranged closely to said second sleeve being turned outwardly from the axis of the motor, whereby said inner jacket and said stator winding form a unit which can be introduced into, and withdrawn from, said outer jacket through said cylindrical end portion thereof.

7. A liquid-impermeable stator for an electromotor adapted to be operated in a submerged condition, comprising in combination, an outer jacket having a cylindrical mid portion and two end portions, one of said end portions being cylindrical and having substantially the same diameter as said cylindrical mid portion, the other of said end portions being tapering; a first annular magnetic core connected to said middle portion of said outer jacket; an inner jacket including a first sleeve sealed hermetically to said tapering end portion of said outer jacket, a second annular magnetic core provided with axial grooves on the outer perimeter thereof and being arranged opposite to said first annular magnetic core, and a second sleeve sealed hermetically to said cylindrical end portion of said outer jacket, said sleeves being arranged, respectively, on the sides of said second annular magnetic core; means for pressing said sleeves toward each other so as to hold said second annular magnetic core firmly between said sleeves; a stator winding arranged in the space between said jackets and located at least partly in the grooves of said second annular magnetic core; and an extension forming part of said second sleeve and carrying a terminal board for said stator winding, said stator winding having end loops arranged, respectively, closely to said sleeves, said end loops arranged closely to said first sleeve being turned inwardly toward the axis of the motor, said end loops arranged closely to said second sleeve being turned outwardly from the axis of the motor, whereby said inner jacket and said stator winding form a unit which can be introduced into, and withdrawn from, said outer jacket through said cylindrical end portion thereof.

AMBROGIO RADICE.

REFERENCES CITED

The following references are of record in the file of this patent:

UNITED STATES PATENTS

| Number | Name | Date |
|---|---|---|
| 693,579 | Wait | Feb. 18, 1902 |
| 1,678,380 | Cooper | July 24, 1928 |
| 1,978,100 | Buerke | Oct. 23, 1934 |
| 2,036,456 | Sammarone | May 5, 1936 |
| 2,187,033 | Hubacker | Jan. 16, 1940 |
| 2,400,576 | Sigmund | Mar. 21, 1946 |
| 2,463,936 | Allison | Mar. 8, 1949 |

FOREIGN PATENTS

| Number | Country | Date |
|---|---|---|
| 745,234 | France | Feb. 7, 1933 |